US005383380A

United States Patent [19]

Sartori

[11] Patent Number: 5,383,380

[45] Date of Patent: Jan. 24, 1995

[54] MATERIAL CUTTING MACHINE FOR SLICING A CYLINDER

[75] Inventor: Maurice Sartori, Victoria, Australia

[73] Assignee: B. J. Mackie and Co. (Aust.)Pty. Ltd., Victoria, Australia

[21] Appl. No.: 7,527

[22] Filed: Jan. 22, 1993

[30] Foreign Application Priority Data

Jan. 23, 1992 [AU] Australia .............................. PL0541

[51] Int. Cl.[6] .......................... B23B 5/14; B23B 21/00

[52] U.S. Cl. .......................................... 82/70.1; 82/78; 82/86; 82/93; 82/96; 82/101; 82/132

[58] Field of Search ....................... 82/70.1, 77, 78, 86, 82/93, 94, 96, 101, 115, 132, 169

[56] References Cited

U.S. PATENT DOCUMENTS

| | | | |
|---|---|---|---|
| 983,387 | 2/1911 | McGeouch | 82/93 |
| 1,685,127 | 9/1928 | Hammond et al. | 82/86 |
| 1,777,316 | 10/1930 | Kuffner | 82/169 |
| 1,825,925 | 10/1931 | Shenk | 82/169 |
| 1,864,903 | 6/1932 | Gora | 82/93 |
| 2,457,310 | 12/1948 | Judelshon | 82/86 |
| 2,521,003 | 9/1950 | Gitter | 82/101 |
| 2,521,385 | 9/1950 | Marion | 82/93 |
| 3,521,004 | 9/1950 | Gitter | 82/101 |
| 3,522,748 | 8/1970 | Treffner | 82/169 |
| 3,861,254 | 1/1975 | Stoffels et al. | 82/101 |
| 4,748,881 | 6/1988 | Keeling | 82/49 |

FOREIGN PATENT DOCUMENTS

| | | | |
|---|---|---|---|
| 590064 | 10/1987 | Australia . | |
| 609200 | 2/1935 | Germany | 82/78 |

OTHER PUBLICATIONS

Australian Serial No. 83666/91, published 3 Dec. 1992.

*Primary Examiner*—William E. Terrell

*Attorney, Agent, or Firm*—Hovey, Williams, Timmons & Collins

[57] ABSTRACT

A machine for cutting slices from a cylindrical workpiece such as a log of pressure sensitive tape. The machine has a machine frame and a mandrel on the frame for holding and rotating the cylindrical workpiece. A disc shaped cutting blade is mounted on a carriage and is movable to cut the workpiece into material slices. The carriage is movable to shift the cutting blade to locations along the mandrel at which the workpiece is cut into slices. A drive mechanism is connected to the carriage assembly for moving the carriage assembly along the mandrel. That drive mechanism has a drive handle which can be manually gripped to disengage a drive rack and pinion and so enable movement of the carriage assembly in either direction along the mandrel. A one-way clutch mechanism connects the handle to the pinion so that rotation of the handle in alternate directions incrementally moves the carriage assembly in one direction only along the mandrel.

21 Claims, 3 Drawing Sheets

MATERIAL CUTTING MACHINE FOR SLICING A CYLINDER

BACKGROUND OF THE INVENTION

1. Field of the Invention

This invention relates generally to a machine for accurately and cleanly cutting material, and in particular to such a machine for cutting axial sections or slices from a cylinder, such as a roll or log, of material. The machine is applicable for cutting slices from rolls of sheet material, such as pressure sensitive material, paper, textile, film, foam and sponge, and it will be convenient to hereinafter describe the invention in relation to that exemplary application. It is to be appreciated, however, that the invention is not limited to that application.

2. Description of the Related Art

Australian patent 590064 in the name of the present applicant discloses a machine that has proved very successful in accurately and cleanly slicing rolls or logs of sheet material, particularly logs of sheet material coated with pressure sensitive adhesive and sliced into adhesive tapes. However, that machine has a high capital cost which is difficult to economically justify unless the machine is operated on a substantially continuous basis. In particular, intermittent, low volume or specialist use of the machine is often not economically viable.

Relatively simple cutting or slicing machines have been developed for such use. Those machines replace some of the automatic and machine driven operations with manual operations. In particular, movement of a material cutting blade into locations at which the material is to be sliced is usually achieved manually, rather than through machine driven mechanisms and controls.

Although these simplifications have been found to significantly reduce capital costs, it has been at the expense of ease of operation of the machine and cutting accuracy. In that regard, the arrangements for manually moving the cutting blade have made precise location of the blade difficult. Sometimes, it is not possible to infinitely locate the blade, so that roll or log slicing is limited to a specific range of slice thicknesses. Even then, the accurate repetitive location of the blade can require considerable operator expertise and concentration in order to produce roll or log slices of consistent thicknesses. The general use of unskilled operators for such machines usually means that this is not achieved over any long period of time. In any event, that blade locating procedure is time consuming and typically makes the machine operationally inefficient.

SUMMARY OF THE INVENTION

It is an object of the present invention to provide a relatively simple roll or log cutting machine which enables consistent production of accurately sized roll or log slices.

It is another object of the present invention to provide a relatively inexpensive roll or log cutting machine for economic production of roll or log slices, particularly when operating on an intermittent, low volume or special purpose basis.

With these objects in mind, the present invention provides a machine for cutting slices from a cylinder of material, including: a machine frame; a holding assembly on the frame for holding a cylinder of material for driven rotation about a central longitudinal axis, the holding assembly including an elongate support mandrel rotatably drivable about the central longitudinal axis and a holding mechanism for releasably securing a material cylinder concentrically positioned on the mandrel so as to rotate with the mandrel; a disc shaped cutting blade movable transversely of the longitudinal axis to cut a material cylinder secured to the mandrel, into material slices; a carriage assembly having the cutting blade carried thereon, and mounted on the machine frame for movement relative thereto in order to shift the cutting blade to selected axial cutting locations along the mandrel at which a material cylinder secured thereto is to be cut into slices; and, a drive mechanism connected to the carriage assembly and being manually operable for movement of the carriage assembly in order to shift the cutting blade to the axial cutting locations.

Preferably, the drive mechanism includes an elongate track on the machine frame, and a drive wheel on the carriage assembly and engaging the elongate track. The drive wheel is preferably manually rotatable to rotate along the track. That in turn moves the carriage assembly along the mandrel to shift the cutting blade to an infinite number of cutting locations. In one embodiment, the track is a toothed rack and the drive wheel is a toothed pinion meshing with the rack.

Preferably, the drive mechanism further includes a drive handle connected to the drive wheel. That handle is manually grippable for rotation to rotate the drive wheel.

Preferably the drive handle is connected to the drive wheel through a clutch mechanism. The clutch mechanism positively connects the handle with the drive wheel upon handle rotation in one direction, and disconnects the handle for rotation free of the drive wheel in an opposite direction. In this way, repeated alternate movements of the drive handle in the two directions causes incremental movement of the carriage assembly in one direction along the mandrel. In one embodiment, the drive mechanism includes a drive spindle having one end fixed to the drive wheel on an axis of rotation, and an opposite end connected to the drive handle through the clutch mechanism. Rotation of the drive handle in the one direction causes the clutch mechanism to connect the drive handle to the drive spindle and thereby rotate the drive spindle about the axis of rotation to rotate the drive wheel.

Preferably, the drive mechanism includes indicia means associated with the handle and indicating the distance of movement of the carriage assembly along the mandrel caused by rotation of the drive handle. In one embodiment, the indicia means includes a pair of spaced apart limit indicating elements between which the drive handle can rotate to move the cutting blade a predetermined distance as indicated by the indicia means. One or both of the indicating elements may be movable to vary their separation and thus the extent of drive handle rotation.

Preferably, the drive wheel is selectively disengageable from the track. Upon disengagement the carriage assembly is manually movable for substantially moving of the carriage assembly in either direction along the mandrel. In one embodiment, the drive spindle is connected to the carriage assembly for pivotal movement to carry the drive wheel out of engagement with the elongate track.

Preferably, the carriage assembly is mounted on an elongate support guide for sliding movement therealong in order to move the carriage assembly along the mandrel. In one embodiment, the carriage assembly includes a carriage frame on which the cutting blade is mounted. That carriage frame is slidably mounted on the support guide, as well as being pivotable about the support guide to radially move the cutting blade toward and away from the mandrel for cutting a material cylinder secured thereto into slices. In this embodiment a lever handle is connected to the carriage frame for gripping to manually pivot the carriage frame.

Preferably, the cutting blade is fixed on a support spindle freely rotatably mounted in the carriage assembly. Moreover, a brake mechanism is preferably mounted on the carriage assembly and operable to apply a braking force to the support spindle in order to retard rotation of the cutting blade.

Preferably, the holding mechanism includes an expandible gripper unit carried by the mandrel so as to be located within a material cylinder positioned on the mandrel. This gripper unit is actuable to expand outwardly to engage upon an internal surface of the material cylinder and so drivingly secure the material cylinder for rotation with the mandrel. In one embodiment, the mandrel has a hollow mandrel core in which the gripper unit is located. In this embodiment, the gripper unit includes a set of engaging elements contained within the mandrel core and aligned with respective access openings spaced apart about the mandrel core. Upon gripper unit actuation, the engaging elements move radially outwardly of the mandrel core to project through the access openings for engagement with the material cylinder. In this embodiment, the gripper unit also includes a pair of body sections within the mandrel core providing recesses extending between the body sections in which respective engaging elements are individually contained. Those body sections are relatively movable upon which a camming effect is produced between the body sections and the engaging elements to cause the engaging elements to move radially outwardly. An actuator is provided, in this embodiment, for moving the body sections. That actuator includes an actuating rod on which the body sections are mounted. The rod extends along the mandrel core and protrudes axially therefrom for manual rotation in order to move the body sections relative to one another.

BRIEF DESCRIPTION OF THE DRAWINGS

The following description refers to a preferred embodiment of the machine of the present invention. To facilitate an understanding of the invention, reference is made in the description to the accompanying drawings where the machine is illustrated. It is to be understood that the invention is not limited to the embodiment as hereinafter described and as illustrated.

In the drawings.

DESCRIPTION OF THE PREFERRED EMBODIMENT

Figure 1:
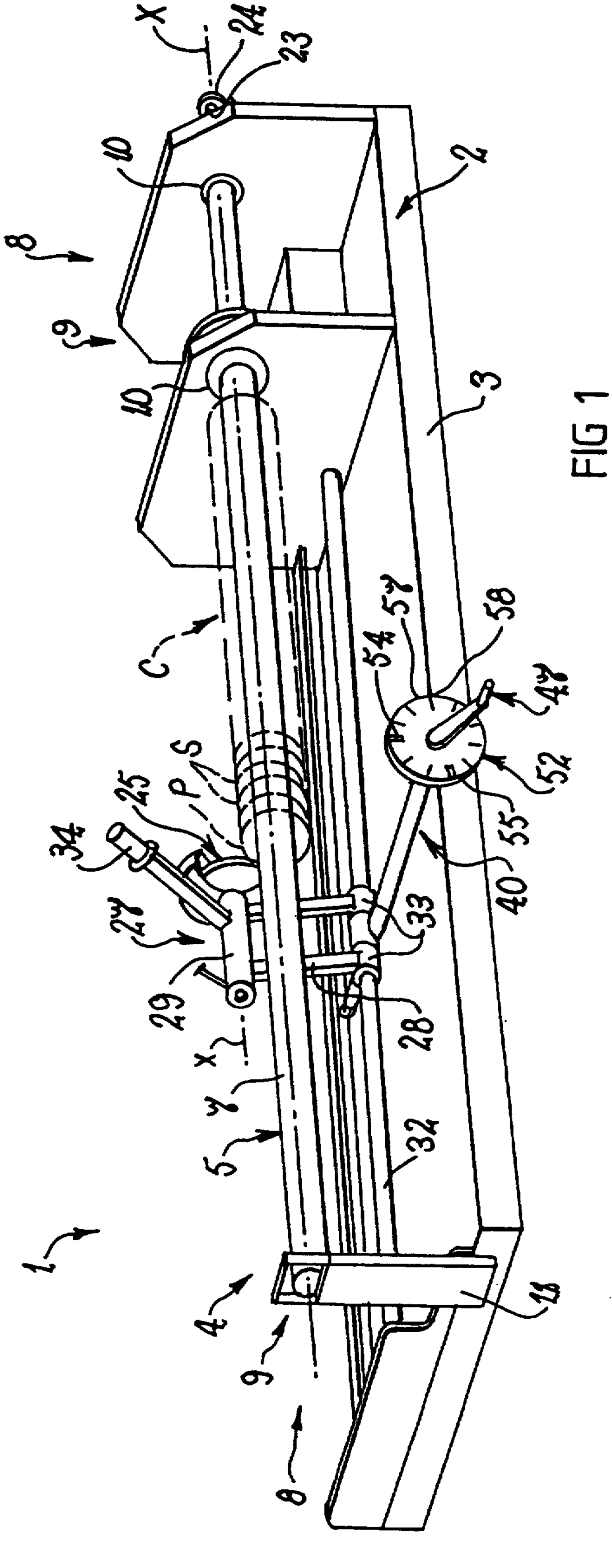
FIG. 1 is a perspective view of the machine according to a preferred embodiment of the present invention.
Figure 2:
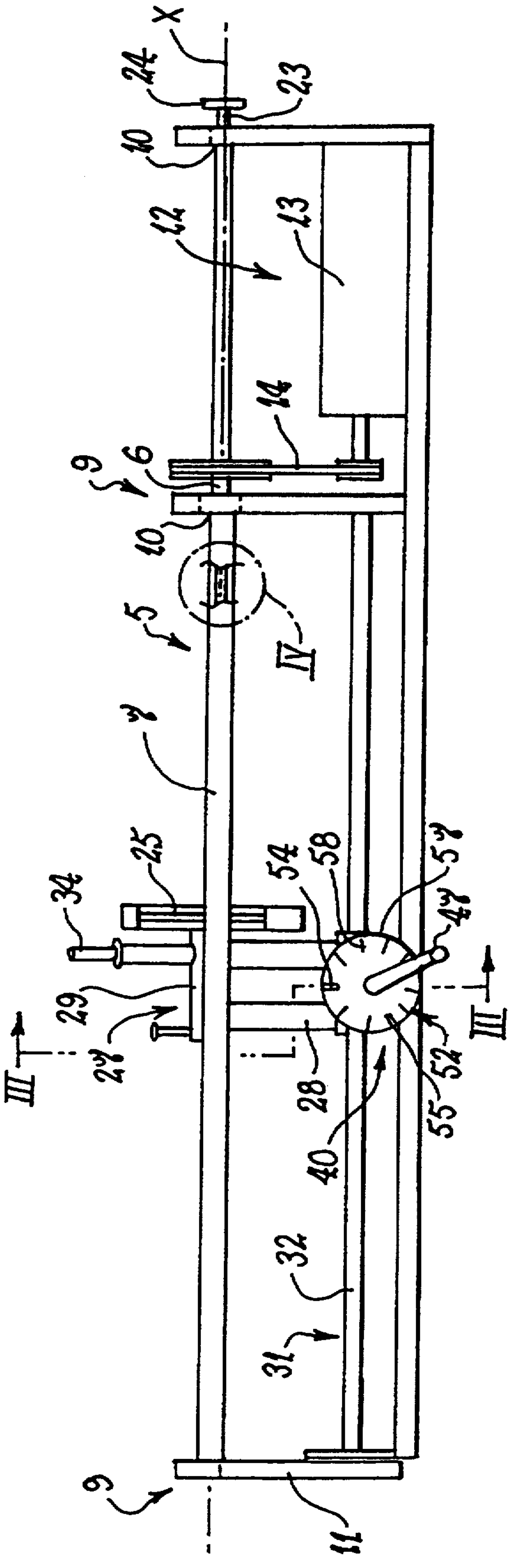
FIG. 2 is a front elevation of the machine of FIG. 1.

Referring to the drawings there is generally shown a machine 1 for cutting slices S from an annular, elongate cylinder or log C of material. The machine includes a frame 2 of any suitable solid construction, formed from cast metal and/or fabricated from suitable heavy gauge metal stock material. That frame 2 is typically constructed so as to minimize distortions which would otherwise inevitably lead to inaccuracies in material cutting during operation of the machine 1.

In one embodiment (as shown), the machine 1 is suitable for mounting on a work bench (not shown). To that end, the frame 2 may comprise a rigid flat base 3 for bearing generally horizontally on the work bench top and on which the remainder of the machine 1 can be generally mounted. In an alternative embodiment (not shown), the machine 1 is provided with a floor stand on which the frame 2 can be floor mounted.

A holding assembly 4 is supported on the frame 2 for holding the material cylinder C for driven rotation about a central longitudinal axis X. The holding assembly 4 includes an elongate support mandrel 5 on which the cylinder C is carried. The mandrel 5 is mounted so as to extend horizontally in use, and is shaped and sized relative to a central passage P of the cylinder C so that the cylinder C is a close sliding fit thereon. In this embodiment, the mandrel 5 is circular in cross sectional shape, and the central passage P may be similarly shaped.

The mandrel 5 is of a generally rigid construction, although (as shown) may have a rigid steel core 6, with soft outer sleeve 7 providing a protective surface layer that may be cut during cutting of the cylinder C, without damaging other machine components. That sleeve 7 may be replaceable as necessary.

The mandrel 5 is mounted for rigid support adjacent opposite ends of the mandrel 5 and/or the cylinder C when positioned thereon. To that end, the holding assembly 4 includes support means 8 which holds the mandrel 5 for rotation about its longitudinal axis X. The support means 8 includes spaced apart support mechanisms 9, between which the mandrel 5 is rotatably supports. Those mechanisms 9 may be of the same or different general construction.

In this embodiment, one support mechanism 9 includes at least one support bearing 10 in which the mandrel 5 is journalled toward one end. A pair of spaced apart bearings 10 may be provided, housed in the machine frame 2, with one end of the mandrel core 6 being journalled in those bearings 10. In this embodiment, the other support mechanism 9 includes a support arm 11 mounted on the machine frame 2 and connected to the mandrel core 6 for support thereof. The support arm 11 is disconnectable from the mandrel core 6 for sliding the material cylinder C onto the mandrel 5 and for removing material slices S therefrom.

The mandrel 5 is rotatably driven during machine operation and, to that end, the holding assembly 4 further includes a rotary drive means 12 connected to the mandrel 5. That drive means 12 includes an electric rotary drive motor 13 connected to the mandrel core 6 through any suitable drive mechanism 14, such a belt and pulley mechanism (as shown), mounted on the machine frame 2.

The material cylinder is secured for rotation with the mandrel 5 during machine operation. To that end, the holding assembly 4 further includes a holding mechanism 15 for releasably securing the cylinder C to the mandrel 5.

The holding mechanism 15 includes an expandable gripper unit 16 carried by the mandrel 5 for rotation therewith and so as to be located within the central passage P of the material cylinder C. The gripper unit 16 is actuable to expand outwardly so as to directly or indirectly drivingly engage with an internal surface defining passage P of the material cylinder C. Thus, as the mandrel 5 and gripper unit 16 rotate so does the cylinder C gripped by the gripper unit 16.

In this embodiment, the gripper unit 16 is located within the mandrel 5. To that end, the gripper unit 16 is located within the mandrel core 6, with access provided therethrough for gripping engagement with the cylinder C. The unit 16 is located toward one end of the mandrel core 6, such as adjacent support bearing 10, so as to engage and grip the cylinder C at one end thereof. That cylinder end will be opposite the end at which slicing of the cylinder C commences so that the cylinder C remains secured to the mandrel 5 as slicing proceeds toward the gripped end.

Figure 4:
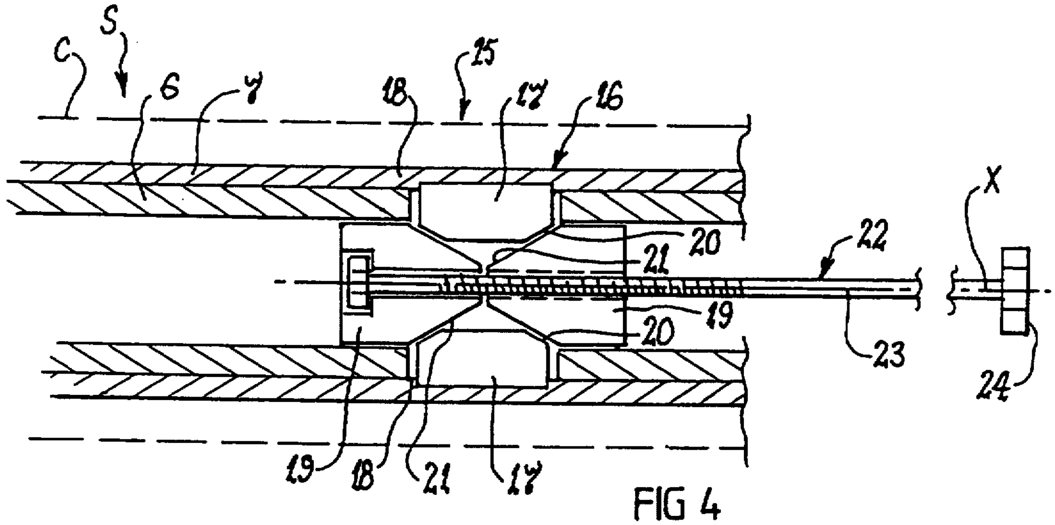
FIG. 4 is an enlarged sectional view of a part of the machine marked IV as shown in FIG. 2.

The gripper unit 16, which is shown in detail in FIG. 4, includes a set of engaging elements 17 acting as internal jaws movable, upon actuation of the gripper unit 16, into and out of engagement with the material cylinder C. The mandrel core 6 is provided with access openings 18 through which those engaging elements 17 can project toward the cylinder C. The outer sleeve 7 may also be provided with similar aligned openings (not shown) so that the engaging element 17 can directly engage upon the surrounding cylinder C. However, as an alternative (as shown), when the outer sleeve 7 is composed of resilient flexible material, the engaging elements 17 may engage upon an internal surface of that outer sleeve 7 which in turn flexes the outer sleeve 7 into engagement with the cylinder C. This may have the advantage of increasing during grip between the mandrel 5 and cylinder C. Engagement with the cylinder C is substantially frictional engagement, in this embodiment.

The engaging elements 17 are arranged in spaced apart relation about the mandrel 5, and move radially into and out of during engagement with a surrounding material cylinder C. A set of four such engaging elements 17 are provided in equispaced relation about the mandrel 5 in this embodiment, although other arrangements may also be suitable.

The gripper unit 16 also includes a pair of body sections 19 in which the engaging elements 17 are housed, the body sections 19 relatively moving on actuation of the gripper unit 16 to move those elements 17. In effect, movement of the body sections 19 produces a camming effect between the body sections 19 and the engaging elements 17 to cause engaging and disengaging movement of those elements 17. That is achieved by providing the body sections 19 with recesses 20 extending between them and in which respective engaging elements 17 are individually contained. A cam surface 21 is provided in each recess 20, and on which the respective engaging element 17 bears and follows during body section movement.

In this embodiment, the body sections 19 are located within the mandrel core 6 in side-by-side relation along the core 6 for relative linear, sliding movement therealong. To that end, each body section 19 is of a cylindrical plug configuration. The recesses 20 are slot-like and extend in an axial direction along the mandrel core 6 within both body sections 19. A bottom surface of each slot recess 20 forms the cam surface 21 so that the engaging elements 17 "ride" on the cam surfaces 21 during movement of the body sections 19. In this way, as the body sections 19 are linearly moved apart, the engaging elements 17 within the recesses 20 move radially inwardly between the separating body sections 19 and extending recesses 20. Where the engaging elements 17 engage against the outer sleeve 7 of the mandrel 5, this movement of the elements 17 is assisted by sleeve resilience. Conversely, as the body sections 19 linearly approach one another, the engaging elements 17 are pushed radially outwardly of their reducing length recesses 20 against the outer sleeve 7 of the mandrel 5, expanding and forcing that sleeve 7 into frictional, driving engagement with a surrounding material cylinder C.

Movement of the body sections 19, and thus the engaging elements 17, is controlled by an actuator 22 included within the holding mechanism 15. The actuator 22 includes an elongate actuating rod 23 on which the body sections 19 are mounted, the actuating rod 23 extending along the mandrel core 6 so as to protrude from one end thereof. The body sections 19 are mounted on the rod 23 so that, upon manual movement of the rod 23, the body sections 19 are relatively moved. In one arrangement (as shown), one of the body sections 19 is screw threadably mounted on the rod 23 so that rotation of the rod 23 linearly moves that body portion 19 toward and away from the other body portion 19.

The actuator 22 also includes a handle 24 on the rod 23 remote from the gripper unit 16 and external to the mandrel 5 for manual gripping for actuation of the rod 23.

It should be appreciated that other holding mechanisms 15 may also be used to secure the material cylinder C on the mandrel 5. One such mechanism 15 may comprise a chuck mounted on the mandrel 5 for gripping of the cylinder C.

A cutting blade 25 is provided to cut the cylinder C transversely of the longitudinal axis X into the material slices S. The cutting blade 25 is of any suitable construction well known by those skilled in the relevant art. In this embodiment, the blade 25 has a circular sharp cutting edge 26 which may be smooth and unserrated, or may be otherwise profiled as determined by the material to be cut. The cutting blade 25 may be positively driven by a drive motor, although in this preferred embodiment the blade 25 in undriven but rotatable upon and by engagement of the cutting edge 26 with the rotating material cylinder C.

The cutting blade 25 is rotatably carried on a carriage assembly 27 having a carriage frame 28 on which the blade 25 is mounted for movement to axial locations along the material cylinder C. The carriage frame 28 is linearly movable in parallel, spaced relation to the central longitudinal axis X. The carriage frame 28 is of a generally solid construction, and may be formed from cast metal and/or fabricated from solid metal stock.

The carriage frame 28 provides a support bearing 29 in which a support spindle 30 is rotatably mounted, the cutting blade 25 being fixed to the support spindle 30 for rotation therewith. The support spindle 30 has an axis of rotation x parallel to the central longitudinal axis X of the material cylinder C. The cutting blade 25 may be removable from the support spindle 30 for replacement as necessary.

The carriage frame 28 is mounted on the machine frame 2 through a support guide 31 which acts to constrain carriage frame linear movement parallel to the mandrel 5. That support guide 31 includes at least one rigid guide rail 32 fixed on the machine frame 2 and on which the carriage frame 28 slides. In this embodiment, a single cylindrical rod-like guide rail 32 is provided. Mounting of the carriage frame 28 on the guide rail 32 may be through one or more slide elements such as slide bearings 33 in which the guide rail 32 is slidably journalled. In this embodiment, a pair of slide bearings 33 are provided in spaced axial relation along the guide rail 32.

Figure 3:
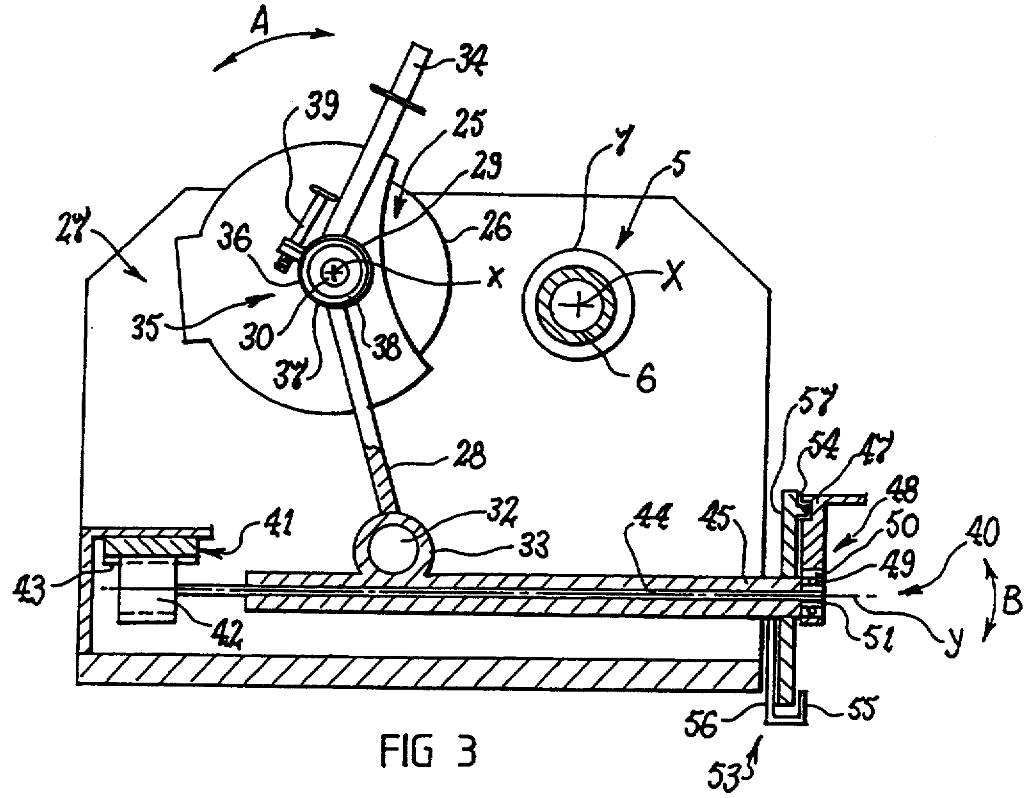
FIG. 3 is an end sectional view through Section III—III of FIG. 2.

The cutting blade 25 is movable toward and away from the material cylinder C at axial locations therealong so that the blade 25 respectively engages with the material for cutting and disengages therefrom for axial movement. In this embodiment, the blade 25 pivots toward and away from the material cylinder C. That movement is achieved by pivotal movement of the carriage frame 28 about the guide rail 32 as shown by arrow A (FIG. 3). Where the carriage frame 28 is mounted through slide elements 33, then the frame 28 may pivot on those elements 33, or with those elements 33, about the guide rail 32. Appropriate stop mechanisms (not shown) may be provided to limit that pivotal movement and, in particular, prevent the cutting blade 25 from cutting through the mandrel 5 or at least beyond the outer sleeve 7 thereof.

In this embodiment, the carriage frame 28 is manually pivoted. To that end, the carriage assembly 27 further includes a lever handle 34 connected to the carriage frame 28 to manually grip for pivotal movement.

To facilitate control of the cutting blade rotation, particularly when not positively driven, the machine 1 also includes a brake mechanism 35 operable to apply a braking force to the blade 25 so as to retard its rotation. That braking force can be applied throughout cutting operations, thereby causing a "drag" effect on the blade 25 which has been found to improve material cutting, at least in the exemplary application of the machine 1.

Any suitable brake mechanism 35 may be adopted. However, in this embodiment, that mechanism 35 comprises a simple band brake 36 mounted on the carriage frame 28 and acting on the support spindle 30. That band brake 36 includes an open band 37 extending circumferentially about the support spindle 30, and secured against rotation with the spindle 30 but in direct (not shown) or indirect (as shown) rubbing engagement therewith. Indirect rubbing engagement may occur through the use of a wear collar 38 interposed between the band 37 and support spindle 30. A band tensioner 39 is connected between adjacent ends of the band 37. The tensioner 39 is manually adjustable to move the band ends circumferentially toward and away from one another so as to increase and decrease the rubbing engagement of the wear collar 38 with the spindle 30, and thereby vary a braking force on the spindle 30.

A drive mechanism 40 is connected to the carriage assembly 27 for moving that assembly along the mandrel 5 in order to axially shift the cutting blade 25. The drive mechanism 40, which is shown in detail in FIG. 3, includes an elongate track 41 mounted on the machine frame 2 and a drive wheel 42 mounted on the carriage assembly 27, the drive wheel 42 being manually rotatable in order to rotate along the elongate track 41 and thereby move the carriage assembly 27 and cutting blade 25. The elongate track 41 extends parallel to the central longitudinal axis X, and the drive wheel 42 is mounted for rotation on an axis y perpendicular thereto.

The track 41 and drive wheel 42 are orientated so as to assist in the support of the carriage assembly 27 and cutting blade 25, particularly when the blade 25 is in a material cutting position. To that end, the track 41 is located rearwardly of the guide rail 32 relative to the mandrel 5, and has a downwardly facing wheel engaging surface 43 extending therealong. The drive wheel 42 is located beneath the track for engagement with the wheel engaging surface 43.

Any suitable arrangement may be provided for ensuring drive traction between the track 41 and drive wheel 42. Frictional engagement therebetween may be sufficient. However, in this embodiment, the track 41 and wheel 42 are toothed, in the form of a rack, and pinion meshing therewith.

The drive wheel 42 is fixed to a drive spindle 44 through which the wheel 42 is manually rotated. The drive spindle 44 in turn is rotatably housed in a drive tube 45 connected to the carriage assembly 27. In this embodiment, that connection is through a slide element, such as a slide sleeve 46, slidably mounted on the guide rail 32 and positioned between the slide bearings 33 for axial movement therewith. In this way, the carriage frame 28 and cutting blade 25 can be pivoted during blade cutting without disengagement of the drive wheel 42 from the elongate track 41. Such disengagement may upset positioning of the blade relative to the material cylinder C.

However, in this embodiment, the drive wheel 42 may also be selectively disengageable from the track 41 in order to achieve rapid substantial traverse of the carriage frame 27 along the mandrel 5 in either linear direction, and thus movement of the cutting blade 25 along the material cylinder C. That may be achieved upon pivoting the slide sleeve 46, by lifting the drive spindle 44 and drive tube 45 connected thereto, as shown by arrow B (FIG. 4), so as to disengage the drive wheel 42 from the elongate track 41. The drive spindle 44 and tube 45 may project sufficiently from the slide sleeve 46 to act as a lever handle whereupon it may be used to slide the carriage assembly 27 along the guide rail 32. The slide sleeve 46 can then be repivoted, by lowering the drive spindle 44 and drive tube 45, to bring the drive wheel 42 back into engagement with the elongate track 41.

Indicia means (not shown) may be provided between the elongate track 41 and wheel 42 to provide an indication of the location of the cutting blade 25 and a measure of movement when setting the blade 25 for cutting slices S of predetermined thicknesses. The indicia means may include visible indicia markings adjacent the elongate track 41 and a cursor line or pointer carried with the carriage assembly 27.

The drive mechanism 40 also includes a drive handle 47 connected to the drive spindle 44. The drive handle 47 is manually gripped for rotating in order to rotate the spindle 44. The handle 47 may be rigidly fixed to the spindle 44. However, in this embodiment, the handle 47 is connected to the spindle 44 through a one-way or over-running clutch mechanism 48. In this way, upon movement of the handle 47 in one direction, the clutch mechanism 48 positively connects the handle 47 with the spindle 44 to rotate that spindle 44, while movement in a reverse direction releases the handle 47 for rotation free of the spindle 44. With this arrangement, the handle 47 may be repetitively rotated back and forth in the two directions to incrementally move the carriage assembly 27 along the mandrel 5 in one direction, and thus the cutting blade 25 to axial cutting locations along the material cylinder C.

The clutch mechanism 48 may be of any suitable construction, well known to those skilled in the art. One such clutch mechanism 48 includes rollers or balls 49 mounted between an outer member 50 and an inner member 51 having cam flats provided around the peripheral surface thereof. Single direction driving connection between the outer member 50 and inner member 51 is obtained by wedging of the rollers or balls 49 between the members 50,51. With this clutch mechanism 48, the inner member 51 is secured to the drive spindle 44, while the handle 47 is secured to the outer member 50.

To enable handle movement in a manner which accurately positions the cutting blade 25, the drive mechanism 40 further includes indicia means 52 associated with the handle 47. In this way, the handle 47 may be moved a distance as indicated by the indicia means 52 to move the blade 25 a predetermined axial distance along the mandrel 5 and material cylinder C. This will permit repeated identical movements of the handle 47 and enable consistent incremental movement of the blade 25.

The indicia means 52 includes a pair of limit indicating elements 53 between which the handle 47 can pivot to move the blade 25 a predetermined distance. One or both of the limit indicating elements 53 are movable to vary their separation and thus the extent of handle movement.

In this embodiment, one of the limit elements 53 is in the form of a detent 54, such as a spring biased ball which projects into a recess in the handle 47 to indicate a limit of handle movement. The detent 54 may be fixed. In this embodiment, the other limit element 53 is in the form of a limit stop 55, against which the handle 47 abuts to limit further handle movement. The limit stop 55 is moveable in this embodiment, for adjusting spacing from the detent 54. To that end, the limit stop 55 may be provided on an arm 56 mounted for pivotal movement about the drive spindle 44.

The indicia means 52 further includes an indicia plate 57 fixed to the drive tube 45 and over which the handle 47 rotates. The plate 57 carries the detent 54, and a series of visual markings 58 to assist in the positioning of the moveablė limit stop 55 overlying the plate 57. Those markings 58 are representative of carriage assembly and blade movement distances along the mandrel 5 and material cylinder C. Thus, by setting the limit stop 55 at a selected arcuate distance from the detent 54 on the plate 57, having regard to the visual markings on the indicia plate 57, a single pivotal movement of the handle 47 from the detent 54 to the limit stop 55 will result in the carriage assembly 27 and the blade 25 moving in one direction along the mandrel 5 and material cylinder C an axial distance represented by the marking at which the limit stop 55 is set.

In using a preferred embodiment of the material cutting machine 1 as described above, a material cylinder C is initially slid onto the mandrel 5 and moved therealong into a position overlying the gripper unit 16. That gripper unit 16 will generally be located toward an end of the mandrel 5 remote from the removable support arm 11, so that the material cylinder C may be slid substantially along the mandrel 5. The support arm 11 will have been disconnected from the mandrel 5 to achieve that mounting, and the arm 11 is then reconnected. Thus, the cylinder C is firmly supported between the support bearings 10 and support arm 11. The holding mechanism actuator 22 is operated at the handle 24 to expand the gripper unit 16 in order to firmly secure the material cylinder C concentrically with the mandrel 5.

Cutting of the material cylinder C commences at the end thereof nearer the support arm 11, with successive cuts proceeding along the cylinder C toward the gripper unit 16. The carriage assembly 27 is manually moved to axially shift the cutting blade 25 into each successive cutting location. That is achieved by initially raising the drive handle 47 and drive spindle 44 so as to pivotably disengage the drive wheel 42 from the elongate track 41 and thereby free the carriage assembly 27 for rapid traverse along the guide rail 32 to a first axial location toward a cylinder end. In that location, the drive handle 47 and spindle 44 are return moved to re-engage the drive wheel 42 with thė elongate track 41.

In this first position, the drive handle 47 will be in a "zero" marking position, engaging the detent 54 on the indicia plate 57.

With the mandrel 5 and cylinder C rotating, the carriage frame 28 is pivoted with the lever handle 34 to bring the cutting blade 25 into cutting engagement with the cylinder C. That engagement causes the blade 25 to rotate and results in material cutting. That cutting will continue until the blade 25 reaches the soft outer sleeve 7 of the mandrel 5 and so cuts a material slice S from the cylinder C. The carriage frame 28 can then be pivoted away from the mandrel 5 so as to retract the cutting blade 25 therefrom.

Depending on the material being cut, the brake mechanism 35 may require adjustment to apply a drag force to the blade support spindle 30 in order to retard blade rotation. The extent of any such braking force will be well appreciated by those skilled in the relevant art.

Following retraction of the cutting blade 25, the drive handle 47 is manually rotated from the detent 54 until abutment with the limit stop 55. That limit stop 55 will have been set against a marking on the indicia plate 57 representative of an axial movement distance of the blade 25 from the "zero" position. Thus, movement of the drive handle 47 from the detent 54 to the limit stop 55 will axially move the blade 25 a distance equal to a predetermined thickness of cylinder slices S.

Following each movement of the handle 47 from the detent 54 to the limit stop 55, the carriage frame 28 is again pivoted to bring the cutting blade 25 into cutting engagement with the material cylinder C. This will result in a series of cylinder slices S of consistent thickness.

Following slicing of the cylinder C, the cutting blade 25 is finally retracted from the mandrel 5, and the mandrel rotation ceased prior to removal of the slices S therefrom. That will again entail disconnection of the support arm 11 from the mandrel 5 and slipping of the slices S therefrom.

A machine according to the present invention is of relatively simple construction and operation, yet enables consistent production of accurately sized material slices. In particular, economic production of such slices is possible even when the machine is operating on an intermittent, low volume or special purpose basis.

Finally, it should be appreciated that various modifications and/or alterations may be made to the machine without departing from the ambit of the present invention defined in the claims appended hereto.

I claim:

1. A machine for cutting slices from a cylinder of material, comprising:

a machine frame;

a holding means on the frame for holding a cylinder of material for driven rotation about a central longitudinal axis, the holding means including an elongate mandrel supported for rotation about the central longitudinal axis and a holding mechanism for releasably securing a material cylinder concentrically positioned on the mandrel so as to rotate with the mandrel;

a means for rotating the mandrel about the central longitudinal axis;

a cutting blade for cutting a material cylinder, secured to the mandrel, into material slices;

a carriage assembly having the cutting blade carried thereon, and being mounted on the machine frame for movement relative thereto in order to shift the cutting blade to selected axial cutting locations along the mandrel at which a material cylinder secured thereto is to be cut into slices; and a drive mechanism connected to the carriage assembly and being operable for moving the carriage assembly in directions along the mandrel in order to shift the cutting blade to the axial cutting locations, the drive mechanism including:

an elongate track mounted on the machine frame;

a drive wheel mounted for movement with the carriage assembly and engaging the elongate track, the drive wheel being rotatable during engagement with the elongate track to rotate along the track and thereby move the carriage assembly along the mandrel to shift the cutting blade to selected cutting locations;

a drive handle manually grippable for movement which manually moves the carriage assembly in either direction along the mandrel to shift the blade to a selected cutting location; and a clutch mechanism selectively drivingly connecting the drive wheel and drive handle, the clutch mechanism being operable to drivingly connect the handle with the drive wheel upon manual rotation of the handle in one direction and to disconnect the handle for rotation free of the drive wheel in an opposite direction, whereby during engagement of the drive wheel with the elongate track repeated alternate rotary movement of the drive handle in the two directions incrementally rotates the drive wheel along the elongate track causing incremental movement of the carriage assembly in one direction only along the mandrel.

2. A machine as claimed in claim 1, wherein the track is a toothed rack and the drive wheel is a toothed pinion meshing with the rack.

3. A machine as claimed in claim 1, wherein the drive mechanism includes a drive spindle having one end fixed to the drive wheel on an axis of rotation, and an opposite end connected to the drive handle through the clutch mechanism, rotation of the drive handle in the one direction causing the clutch mechanism to connect the drive handle to the drive spindle and thereby rotate the drive spindle about the axis of rotation so as to rotate the drive wheel.

4. A machine as claimed in claim 3, wherein the drive mechanism includes indicia means associated with the handle for indicating the distance of movement of the carriage assembly along the mandrel caused by rotation of the drive handle.

5. A machine as claimed in claim 4, wherein the indicia means includes a pair of spaced apart limit indicating elements between which the drive handle can rotate to move the cutting blade a predetermined distance as indicated by the indicia means, one or both of the indicating elements being movable to vary their separation and thus the extent of drive handle rotation.

6. A machine as claimed in claim 5, wherein the indicia means further includes an indicia plate with which the limit indicating elements are associated and over which the drive handle rotates, the plate carrying a series of visual markings to assist in the positioning of the indicating elements, the markings being representative of carriage assembly movement distances along the mandrel.

7. A machine as claimed in claim 3, wherein the drive spindle is connected to the carriage assembly for pivotal movement relative thereto, pivotal movement of the drive spindle disengaging the drive wheel from the elongate track to enable manual movement of the carriage assembly in either direction along the mandrel.

8. A machine as claimed in claim 7, wherein the drive spindle is pivotably connected to the carriage assembly adjacent the one end fixed to the drive wheel and projects from the carriage assembly to the opposite end at which the drive handle is located, the drive handle being manually grippable to pivot the drive spindle for disengagement of the drive wheel and track, and to thereafter manually move the carriage assembly for substantial movement of the carriage assembly in either direction along the mandrel.

9. A machine as claimed in claim 7, wherein the carriage assembly is mounted on an elongate support guide for sliding movement therealong in order to permit movement of the carriage assembly along the mandrel, and the drive mechanism includes a slide element slidably mounted on the support guide and connected to the carriage assembly, the drive spindle being connected to the slide element so that rotation of the drive wheel along the track slides the slide element along the support guide and, with it, the carriage assembly.

10. A machine as claimed in claim 9, wherein the support guide is a cylindrical guide rod, and the slide element is a slide sleeve pivotable about the guide rod for pivotal movement of the drive spindle so as to disengage the drive wheel from the elongate track.

11. A machine as claimed in claim 10, wherein the carriage assembly includes a carriage frame on which the cutting blade is mounted, the carriage frame being slidably mounted on the support guide for movement with the slide element, and pivotable about the support guide to permit radial movement of the cutting blade toward and away from the mandrel, and a lever handle connected to the carriage frame for gripping to permit manual pivoting of the carriage frame.

12. A machine as claimed in claim 1, wherein the cutting blade is fixed on a support spindle freely rotatably mounted in the carriage assembly, and further including a brake mechanism mounted on the carriage assembly and operable to apply a braking force to the support spindle in order to retard rotation of the cutting blade.

13. A machine as claimed in claim 12, wherein the brake mechanism includes a band brake having an open band mounted on the carriage assembly and extending circumferentially about the support spindle in direct or indirect rubbing engagement therewith, and a band tensioner manually adjustable so as to vary the rubbing engagement of the band with the spindle and thereby vary a braking force applied to the support spindle.

14. A machine as claimed in claim 1, wherein the holding mechanism includes an expandable gripper unit carried by the mandrel so as to be located within a material cylinder positioned on the mandrel, and means for expanding the gripper unit outwardly so as to directly or indirectly engage upon an internal surface of the material cylinder thereby to drivingly secure the material cylinder on the mandrel for rotation therewith.

15. A machine as claimed in claim 14, wherein the support mandrel has a hollow mandrel core in which the gripper unit is located, and the gripper unit includes a set of engaging elements contained in the mandrel fore and aligned with respective access openings spaced apart about the mandrel core, the engaging elements, upon actuation of the means for expanding the gripper unit, being movable radially outwardly of the mandrel core so as to project through the access openings for engagement with the material cylinder.

16. A machine as claimed in claim 15, wherein the means for expanding the gripper unit includes a pair of body sections within the mandrel core and together providing recesses extending between the body sections in which respective engaging elements are individually contained, the body sections being relatively movable upon which a camming effect is produced between the body sections and the engaging elements to cause the engaging elements to move radially outwardly.

17. A machine as claimed in claim 16, wherein the body sections are located in side-by-side relation along the mandrel core for relative linear sliding movement therealong, and the recesses are slots extending along the mandrel core with each slot having a bottom surface providing a cam surface on which respective engaging elements bear and follow during body section movement, movement of the body sections toward one another causing the engaging elements to be pushed radially outwardly of their reducing length slots.

18. A machine as claimed in claim 17, wherein the means for expanding the gripper unit includes an actuator for moving the body sections, the actuator including an actuating rod on which the body sections are mounted and extending along the mandrel core so as to protrude axially therefrom, and a means for manually rotating the actuating rod to linearly move the body sections relative to one another.

19. A machine for cutting slices from a cylinder of material, comprising:

a machine frame;

a holding means on the frame for holding a cylinder of material for driven rotation about a central longitudinal axis, the holding means including an elongate mandrel supported for rotation about the central longitudinal axis and a holding mechanism for releasably securing a material cylinder concentrically positioned on the mandrel so as to rotate with the mandrel;

a means for rotating the mandrel about the central longitudinal axis;

a cutting blade for cutting a material cylinder, secured to the mandrel, into material slices;

a carriage assembly having the cutting blade carried thereon, and mounted on the machine frame for movement relative thereto in order to shift the cutting blade to selected axial cutting locations along the mandrel at which a material cylinder secured thereto is to be cut into slices; and a manually operated drive mechanism connected to the carriage assembly for moving the carriage assembly in order to shift the cutting blade to the axial cutting locations, the drive mechanism including an elongate toothed rack mounted on the machine frame;

a toothed pinion rotatably meshing with the toothed rack;

a drive spindle connected with the carriage assembly and being fixed to the toothed pinion on an axis of rotation;

a drive handle mounted on the drive spindle; and a clutch mechanism operable to drivingly connect the handle with the drive spindle upon manual gripping and rotation of the handle in one direction about the axis of rotation and to disconnect the handle for manual rotation free of the drive spindle in an opposite direction about the axis of rotation, whereby repeated alternate rotary movement of the drive handle in the two directions incrementally rotating the drive spindle, and the toothed pinion fixed thereto, about the axis of rotation causing the toothed pinion to rotate along the toothed rack and thereby incrementally moving the carriage assembly in one direction along the mandrel.

20. A machine as claimed in claim 19, wherein the holding mechanism comprises a gripper unit contained within the mandrel and including:

a set of engaging elements aligned with respective access openings spaced apart about the mandrel;

a pair of body sections located in side-by-side relation along the mandrel for relative linear sliding movement therealong, the body sections together providing recesses extending therebetween and in which respective engaging elements are individually contained, the body sections being relatively movable along the mandrel upon which a camming effect is produced between the body sections and the engaging elements to cause the engaging elements to move radially outwardly so as to directly or indirectly engage upon an internal surface of the material cylinder on the mandrel and thereby drivingly secure the material cylinder on the mandrel for rotation therewith.

21. A machine for cutting slices from a cylinder of material, comprising:

a machine frame;

a holding means on the frame for holding a cylinder of material for driven rotation about a central longitudinal axis, the holding means including an elongate support mandrel rotatably drivable about the central longitudinal axis and a holding mechanism for releasably securing a material cylinder concentrically positioned on the mandrel so as to rotate with the mandrel;

a cutting blade movable transversely of the longitudianl axis to cut a material cylinder, secured to the mandrel, into material slices;

a carriage assembly having the cutting blade carried thereon, and mounted on the machine frame for movement relative thereto in order to shift the cutting blade to selected axial cutting locations along the mandrel at which a material cylinder secured thereto is to be cut into slices, and;

a drive mechanism connected to the carriage assembly and being operable for movement of the carriage assembly in directions along the mandrel in order to shift the cutting blade to the axial cutting locations, the drive mechanism including:

an elongate track mounted on the machine frame;

a drive wheel mounted on the carriage assembly and being pivotable relative thereto for selective engagement with and disengagement from the elongate track, the drive wheel being rotatable during engagement with the elongate track to rotate along the track and thereby move the carriage assembly along the mandrel to shift the cutting blade to selected cutting locations;

a drive handle connected to the drive wheel and grippable for manual pivotal movement which pivots the drive wheel out of engagement with the elongate track followed by manual linear movement in either direction along the mandrel to move the carriage along the mandrel and thereby shift the blade to a selected cutting location; and a clutch mechanism selectively drivingly connecting the drive wheel and drive handle, the clutch mechanism being operable to drivingly connect the handle with the drive wheel upon manual rotation of the handle in one direction and to disconnect the handle for rotation free of the drive wheel in an opposite direction, whereby during engagement of the drive wheel with the elongate track repeated alternate rotary movement of the drive handle in the two directions incrementally rotates the drive wheel along the elongate track causing incremental movement of the carriage assembly in one direction only along the mandrel.

* * * * *